United States Patent [19]

Nakazawa et al.

[11] Patent Number: 4,849,781
[45] Date of Patent: Jul. 18, 1989

[54] RANGE DETECTOR

[75] Inventors: Hirotsugu Nakazawa; Mitsugi Fukushima, both of Hachioji, Japan

[73] Assignee: Olympus Optical Co., Ltd., Japan

[21] Appl. No.: 136,725

[22] Filed: Dec. 22, 1987

[30] Foreign Application Priority Data

Dec. 27, 1986 [JP] Japan .................................. 61-314018
Feb. 12, 1987 [JP] Japan .................................... 62-30829

[51] Int. Cl.⁴ ............................................... G03B 3/00
[52] U.S. Cl. ........................................ 354/403; 356/1; 250/214 D
[58] Field of Search ............................ 354/403; 356/1; 250/214 D

[56] References Cited

U.S. PATENT DOCUMENTS

| | | | |
|---|---|---|---|
| 4,441,810 | 4/1984 | Momose et al. | 354/403 |
| 4,542,971 | 9/1985 | Nomata | 354/403 |
| 4,615,616 | 10/1986 | Shiomi | 354/403 |
| 4,701,048 | 10/1987 | Tokuda et al. | 354/403 |

FOREIGN PATENT DOCUMENTS

0013210 1/1985 Japan .

Primary Examiner—Russell E. Adams
Attorney, Agent, or Firm—Louis Weinstein

[57] ABSTRACT

A range detector detects a range to an object to be measured by projecting light rays from a light source onto the object and producing an output signal by receiving light rays reflected by the object by a single semiconductor position detecting element (PSD) disposed at a given base length apart from the light source. The position detecting element is provided with signal electrodes of N pieces (N≥3) in a separate manner and in a direction of the base length so that a light receiving plane of the PSD is divided into (N−1) areas. The range detector is capable of reducing a detectable close range so as to cover a very wide range by selectively deciding an output from these signal electrodes in accordance with a range to be measured without degrading accuracy of range measurements.

23 Claims, 9 Drawing Sheets

RANGE DETECTOR

BACKGROUND OF THE INVENTION

The present invention relates to a range detector, and more particularly, to an improvement of a range detector of the light projection type which employs a semiconductor position detecting element (hereinafter referred to as PSD).

Figure 1:
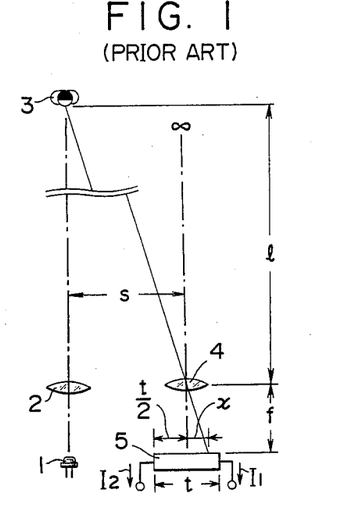
FIG. 1 is a schematic diagram illustrating an example of a conventional range detector.

As is well known, a range detector of the light projection type for measuring a range by projecting light rays onto an object being photographed and receiving light rays reflected by the object with a PSD has been hitherto employed. In a range detector, as shown in FIG. 1, pulsed light rays thrown onto an object 3 being photographed by a light emitting element 1 for projection which emits infrared rays (hereinafter referred to as IRED) are focused by a projecting lens 2 to irradiate the object 3 and light rays reflected by the object 3 form an image by lens 4 on a PSD 5. An image forming position at a distance x from the optical axis of the lens 4 is determined as follows.

$$x = s \cdot f / l$$

Where l is a range to the object 3, f is a distance between the lens 4 and the PSD 5 and s is a base length. Assuming that t is a length of the PSD 5 and the optical axis of the lens 4 is in agreement with the center line of the PSD 5, a ratio between signal currents $I_1$ and $I_2$ which are generated from signal electrodes at the opposite ends of the PSD 5 when incident light is at the position x is expressed as follows.

$$\begin{aligned} I_1/I_2 &= (t/2 + X)/(t/2 - x) \\ &= (t/2 + s \cdot f/l)/(t/2 - s \cdot f/l) \end{aligned}$$

Solving the above equation regarding the object range l, it follows that $$l = (2sf/t) \times \{(I_1/I_1/I_2 + 1)/(I_1/I_2 - 1)\} \quad (1)$$

From this, it is possible to obtain the object range l by calculating the signal ratio $I_1/I_2$ obtained from the PSD 5.

Figure 2:
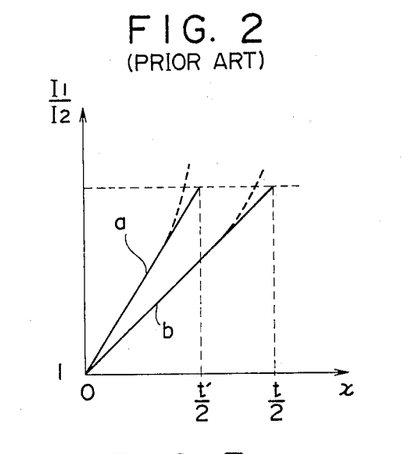
FIG. 2 is a diagram illustrating the relation between a signal current ratio $I_1/I_2$ and a position of incident light in the range detector shown in FIG. 1.

FIG. 2 shows a relationship between x and $I_1/I_2$. When the object 3 is at infinity, projected light rays are parallel to reflected light rays, namely x=0, so that $I_1 = I_2$ and $I_1/I_2 = 1$. In addition, since $x \geq 1/l$ from the equation $x = s \cdot f/l$, x on the abscissa is proportional to the reciprocal of the object range. The solid lines a and b represent outputs when respective PSDs having different lengths from each other are employed, namely, the lengths of respective PSDs are t' and t and t' < t. From FIG. 2 it is noted that the longer a PSD, the smaller an output signal current ratio $I_1/I_2$.

In addition, when the differential output V between both signals $I_1$ and $I_2$ is normalized by the total current $I_1 + I_2$, the following equation is obtained.

$$V = \frac{I_1 - I_2}{I_1 + I_2} = \frac{2x}{t} = \frac{2}{t} \cdot \frac{s \cdot f}{l}$$

Thus, the normalized differential output V is proportional to an incident light position x and inversely proportional to an object range. Accordingly, it is also possible to detect an object range by obtaining the output V. The relationship between x and V is shown in FIG. 3, which will be detailed later.

On the other hand, in FIG. 1, when a value x exceeds t/2 as an object range l is reduced, light rays reflected by the object 3 do not form an image on the PSD, failing to detect a range. Namely in a range detector of the kind described a detectable close range is limited. Accordingly, when a length t of the PSD 5 is increased so that a value x does not exceed t/2 even when an object range l is reduced, a detectable close range can be made close up to a practically allowable extent. In practice, however, an amount of signal light incident upon the PSD 5 after reflected by the object 3 is very limited and noise components such as circuit noise are further added to output signals, necessitating increasing of a change of an output signal to an object range l. This is shown in FIG. 3.

Figure 3:
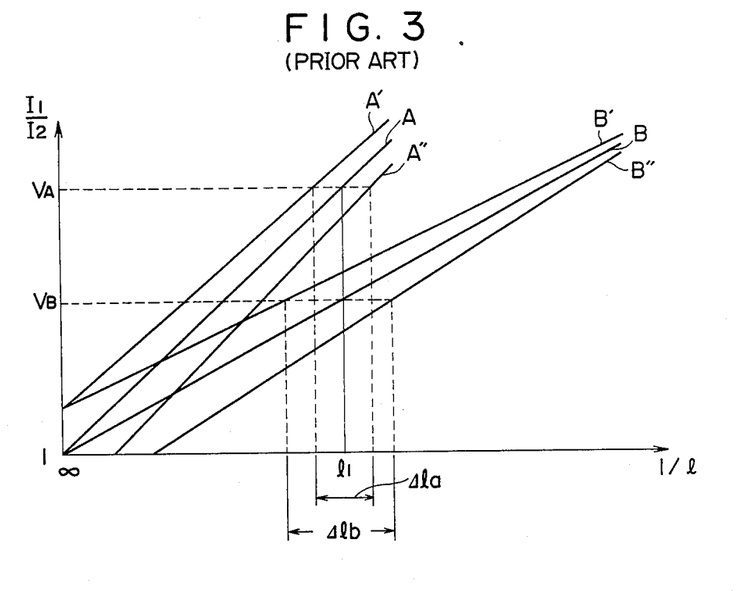
FIG. 3 is a diagram illustrating the relation between a signal current ratio $I_1/I_2$ and a reciprocal of an object range in the range detector shown in FIG. 1.

In FIG. 3, in which the abscissa represents a reciprocal of an object range l and the ordinate represents a signal current ratio $I_1/I_2$, the PSD B is longer in length than the PSD A, so that the former is shorter than the latter in a detectable close range.

Both PSDs A and B would have the same amount of scattering in output signals caused by circuit noise at an equal object range. In FIG. 3, A' and A" represent noise components to A, and B' and B" represent noise components to B. In order to judge a range l1, when a value VA is taken as a decision signal in A, a decision width $\Delta$la is caused in a range component due to A' and A" and when a value VB is taken as a decision signal in B, a decision width $\Delta$lb is caused in a range component due to B' and B". Consequently, it will be noted that A is better than B in accuracy because of $\Delta$la < $\Delta$lb. In other words, in order to reduce a detectable close range, when only a length of the PSD is increased, a decision width increases, thus lowering the accuracy.

To solve such problem, it is conceivable to reduce noise components and to this end, it is necessary to increase an amount of light emitted from the IRED, a light receiving area of the receiving lens and thereby an amount of light incident upon a PSD. It involves other problems of increasing cost and space.

On the other hand, in order to eliminate the disadvantages, it is conceivable to use a method of disposing two light emitters for projection with different base lengths and selecting either of them in response to an object range. However, such method also results in an increase in cost and space.

SUMMARY OF THE INVENTION

It is an object of the present invention to provide a range detector with a single position detecting element which makes a detectable close range small and improves an accuracy in range detection.

A range detector of the present invention employing a single PSD has at least one intermediate electrode which is provided between a pair of signal electrodes provided on the PSD as an electrode for producing a current corresponding to an object range and a switching means is provided to shift in response to an object range between a condition of employing an output current from the pair of signal electrodes for detecting a range and another condition of employing an output current from one of the pair of signal electrodes and the intermediate electrode or an output current from two intermediate electrodes.

Further, a range detector of the present invention which projects light beams onto an object being photographed, receives light beams reflected by the object on a single PSD disposed at an interval of a given base length and detects a range to the object by an output from the PSD, is that N(N≧3) pieces of signal electrodes are separately disposed on the PSD in a direction of the base length to detect a range to the object by output signals from the signal electrodes located at opposite ends of each light receiving plane of the PSD divided into (N−1) pieces by the signal electrodes.

According to the present invention, it is possible to shorten the detectable close range without lowering measuring accuracy and even without providing two or more light emitters or light projectors.

Further, according to the present invention, addition of at least one signal electrode in the middle of a light receiving plane of a PSD enables detection over a wide range and prevents an accuracy from lowering by noise of extraneous light and the like.

DESCRIPTION OF THE PREFERRED EMBODIMENTS

Figure 4:
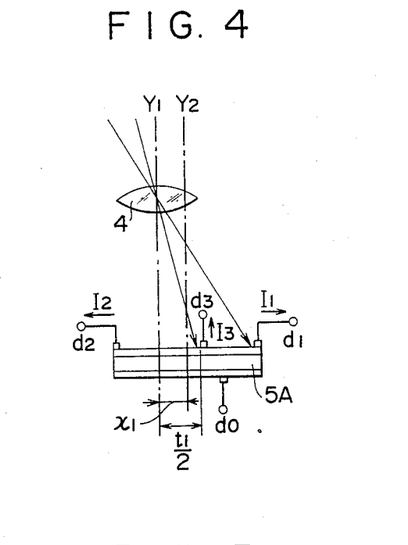
FIG. 4 is a plan view illustrating a first embodiment of a range detector according to the present invention.
Figure 5:
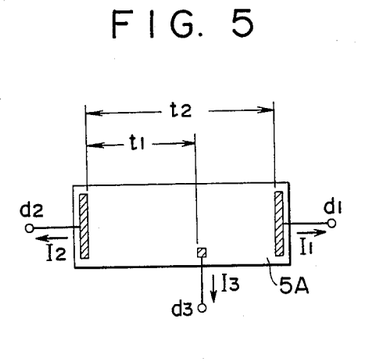
FIG. 5 is a front view illustrating a detecting element of the first embodiment.

In FIGS. 4 and 5, which illustrate a first embodiment of a range detector of the present invention, elements like those in a conventional range detector shown in FIG. 1 are given like reference characters and hence its detailed description will be omitted.

Figure 6:
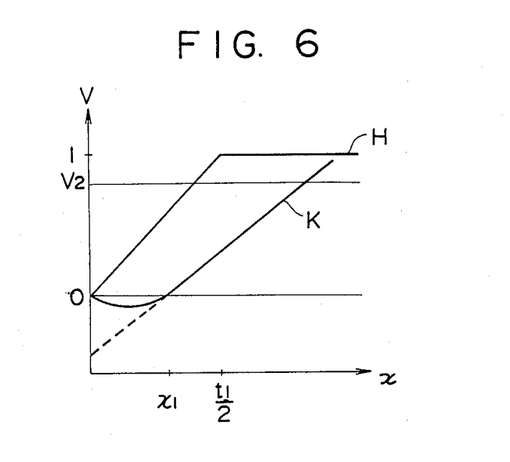
FIG. 6 is a diagram illustrating an output response in the range detector of the first embodiment.

In FIGS. 4 and 5, in addition to signal electrodes $d_1$ and $d_2$ provided at the opposite ends of a PSD 5A, an intermediate electrode $d_3$ is provided therebetween on the PSD 5A. As shown in FIG. 4, when an optical axis $y_1$ of a light receiving lens 4 is set in the center between the signal electrode $d_2$ and the intermediate electrode $d_3$ and the electrode $d_1$ is open, a photocurrent is divided into the electrodes $d_2$ and $d_3$ and a current $I_1$ is zero. At this time, assuming that an output V is expressed as follows, $$V_{23}=(I_3-I_2)/(I_3+I_2),$$

an output V, as shown with a response line H in FIG. 6, is proportional to an incident light position x as far as $t_l/2$ of the position x and becomes 1 when the position x exceeds $t_1/2$. This is because a whole photocurrent is produced from the intermediate electrode when x is above $t_1/2$.

When an output V is obtained using the following equation on the basis of a signal current produced from the signal electrodes $d_1$ and $d_2$ by opening the intermediate electrode $d_3$ $$V_{12}=(I_1-I_2)/(I_1+I_2),$$

the result is as shown with a response line K in FIG. 6. The broken line portion of the line K represents where a photocurrent produced by incident light rays is stable irrespective of an object range. At this time, an output V is zero when an incident light position is at the center between the electrodes $d_1$ and $d_2$, that is, $x_1$ because $I_1=I_2$, a positive value when the light position is above $x_1$ because $I_1>I_2$ and a negative value when below $x_1$. In practice, however, a photocurrent varies with an object range, becomes especially small at a long object range and zero at infinity. Accordingly, an output V becomes zero at an incident light position where it is nearly zero to assume a form represented by a solid line.

In view of the foregoing, it is noted that it is possible to bring a detectable object range closer to a camera by changing a combination of electrodes in use in accordance with an object range without lowering measuring accuracy at a long distance.

Figure 7:
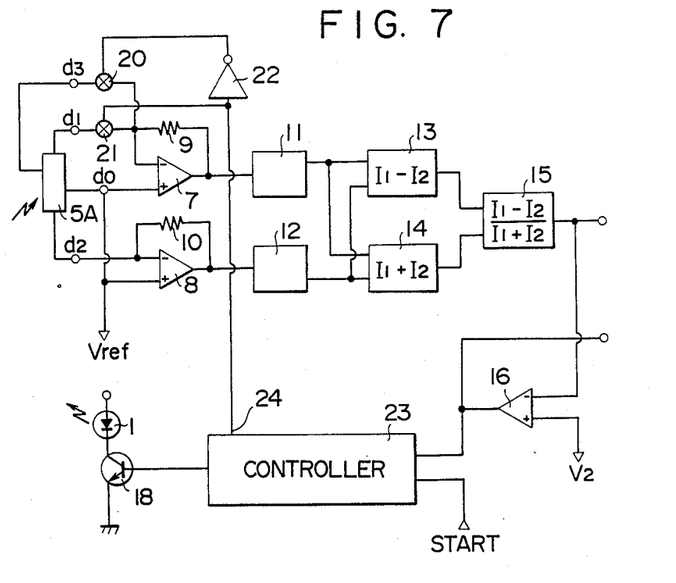
FIG. 7 is a diagram of an electric circuit used in the range detector of the first embodiment.

FIG. 7 illustrates an example of a range detector circuit employing the PSD 5A. In FIG. 7, a common electrode $d_0$ of the PSD 5A is connected to non-inverting input terminals of first and second operational amplifier 7 and 8 as well as to a terminal for applying a reference voltage Vref. An intermediate electrode $d_3$ is connected through an analog switch 20 or an inverting input terminal of the amplifier 7. A signal electrode $d_1$ is connected through an analog switch 21 to an inverting input terminal of the amplifier 7 and a signal electrode $d_2$ is connected to an inverting input terminal of the amplifier 8. The amplifiers 7 and 8 are each provided with a negative feedback through respective resistors 9 and 10 form a current-voltage conversion circuit. Filters 11 and 12 are connected to output terminals of respective amplifiers 7 and 8 to detect a change in a photocurrent produced by projection of the light emitter 1 and a photocurrent stationarily produced by background light or the like. A differential signal generator 13 is connected to the filters 11 and 12 to produce a difference between both outputs. An additive signal generator 14 is connected to the filters 11 and 12 to produce an addition of both outputs. A range signal generator 15 is connected to the additive signal generator 14 and the differential signal generator 13 to produce an output signal corresponding to a ratio between a differential output and an additive output, that is, an object range. An output from the range signal generator 15 and a comparison voltage $V_2$ are delivered to a comparison circuit 16 which compares these inputs. The comparison voltage $V_2$ is a predetermined voltage selected by properly considering factors such as a detection accuracy, a photographing close range and the like. A transistor 18 is connected to the light emitter 1 to be turned on in a pulsed manner by an output from a control circuit 23, as when a release button is depressed. The analog switch 20 is interposed between the intermediate electrode $d_3$ and the inverting input terminal of the amplifier 7 and connected through an inverter 22 to the control circuit 23. The analog switch 21 is interposed between the signal electrode $d_1$ and the inverting input terminal of the amplifier 7 and connected to the control circuit 23. The analog switches 20 and 21 turn on when they receive a signal "H" of a high level.

In operation, in an initial condition, a signal "L" of a low level is delivered from a control terminal 24 of the control circuit 23. At this time, the analog switch 21 turns off and the analog switch 20 turns on. Accordingly, the intermediate electrode $d_3$ of the PSD 5A is connected to the inverting input terminal of the amplifier 7 which forms a current-voltage conversion circuit and the electrode $d_1$ is opened. Thereupon, when the transistor 18 is turned on in cooperation with depression of a release button to emit light rays from the light emitter 1 in a pulsed manner by an output of the control circuit 23, a photocurrent of the PSD 5A produced by light rays reflected by an object being photographed is delivered which is divided into the intermediate electrode $d_3$ and the signal electrode $d_2$ in accordance with an incident light position of the light rays. Signal currents thus divided receive a current-voltage conversion by the amplifiers 7 and 8, respectively, to be delivered which are separated from a photocurrent generated by stationary light rays in the filters 11 and 12. Outputs from the filters 11 and 12 are calculated in the differential signal generator 13, additive signal generator 14 and range signal generator 15. Let $I_1$ and $I_2$ denote signal currents from the intermediate electrode $d_3$ and the signal electrode $d_2$, respectively. An output V from the range signal generator 15 is given as follows, $$V_{23} = f((I_3 - I_2)/(I_3 + I_2))$$

where f represents a coefficient regarding the current-voltage conversion. Consequently, when the PSD 5A is placed relative to the optical axis of the light receiving lens 4 as shown in FIG. 4, an analog output inversely proportional to an object range as shown with the response line H in FIG. 6 is obtained.

On the other hand, when an output V from the range signal generator 15 is larger than the comparison voltage $V_2$, an output from the comparator 16 turns to the "L" level and the control circuit 23 turns an output of the control terminal 24 to the "H" level to resume light emission from the light emitter 1 in a pulsed manner. At this time, the analog switch 20 turns off and the analog switch 21 turns on to connect the signal electrode $d_1$ of the PSD 5A to the inverting terminal of the amplifier 7 and to open the intermediate electrode $d_3$. Consequently, a photocurrent generated by reflected light rays is divided into the signal electrodes $d_1$ and $d_2$. Assuming that respective signal currents are denoted by $I_1$ and $I_2$, the following output is obtained from the range signal generator 15, in a similar manner to the foregoing range detection.

$$V_{12} = f((I_1 - I_2)/(I_1 + I_2)).$$

The outputs are shown with the response line K in FIG. 6.

When a range of an object being photographed is such that an output of the range signal generator 15 is smaller than the comparison voltage $V_2$ at a first range detection, that is, an output of the comparator 16 is at the "H" level, the result obtained in the first detection is employed as a range signal of the object. When a range of the object is such that an output of the range signal generator 15 is larger than the comparison voltage $V_2$, that is, an output of the comparator 16 is at the "L" level, the result obtained in a second range detection after properly calculating is employed as a range signal of the object. Thereby, it is possible to make the detectable object range close to the extent that an object range is more than a value corresponding to $V_2$ without lowering range detection accuracy. At the second detection, a change in output for a range signal to an amount of movement in a reflected light position is smaller than that at the first detection and an accuracy in detection tends to be lowered. In a close range, however, since reflected light rays are stronger and effects of circuit noise and the like reduced, such a tendency at the second detection does not become a problem.

Figure 8:
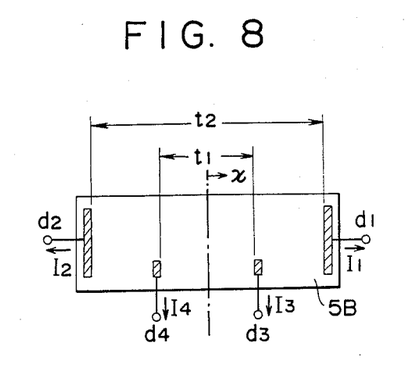
FIG. 8 is a front view illustrating a detecting element of a second embodiment of a range detector according to the present invention.
Figure 9:
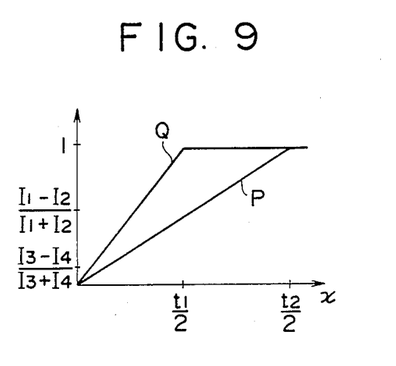
FIG. 9 is a diagram illustrating an output response in the range detector of the second embodiment.

In FIG. 8 which is a front view of a PSD 5B in a range detector of a second embodiment according to the present invention, signal electrodes $d_1$ and $d_2$ are provided at opposite ends of the PSD 5B and intermediate electrodes $d_3$ and $d_4$ are provided between the signal electrodes $d_1$ and $d_2$. These electrodes $d_1$ to $d_4$ are positioned such that their centers are on the same level. When signal currents are detected with either one of the combination of the electrodes $d_1$ and $d_2$ and the combination of the electrodes $d_3$ and $d_4$, outputs are obtained as shown in FIG. 9, where x denotes a distance of an incident light position from the center of the PSD 5B. A response line P represents the case that the electrodes $d_1$ and $d_2$ are selected and a response line Q represents the case that the electrodes $d_3$ and $d_4$ are selected.

Figure 10:
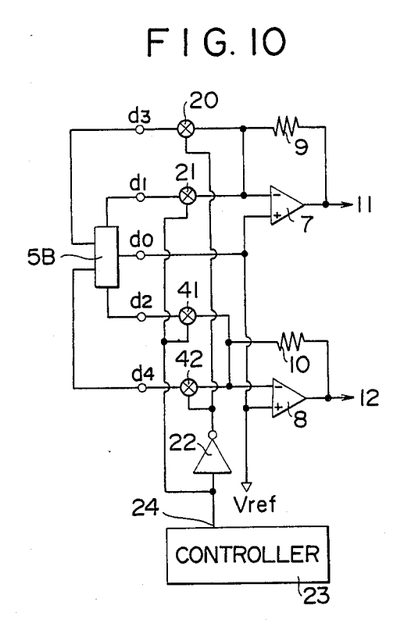
FIG. 10 is a diagram of an electric circuit used in the range detector of the second embodiment.

In FIG. 10, which illustrates an example of an electric circuit in a range detector employing the PSD 5B, circuit elements like those shown in FIG. 7 are given like reference characters and its detailed description will be omitted. Difference from the circuit shown in FIG. 7 is only that analog switches 41 and 42 for selecting the signal electrode $d_2$ and the intermediate electrode $d_4$ are added such that when a control terminal 24 of a control circuit 23 is at the "H" level, the electrodes $d_1$ and $d_2$ are connected to operational amplifiers 7 and 8 and when at the "L" level, the electrodes $d_3$ and $d_4$ are connected to the amplifiers 7 and 8.

Figure 11:
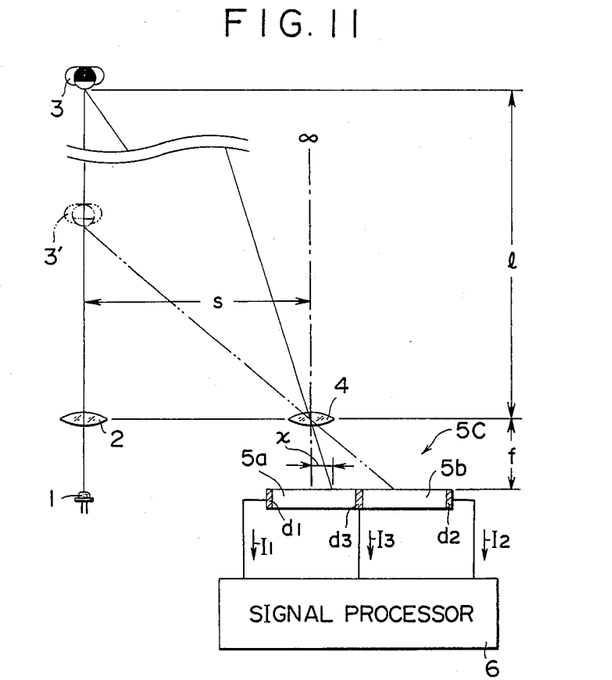
FIG. 11 is a plan view illustrating a third embodiment of a range detector according to the present invention.
Figure 12:
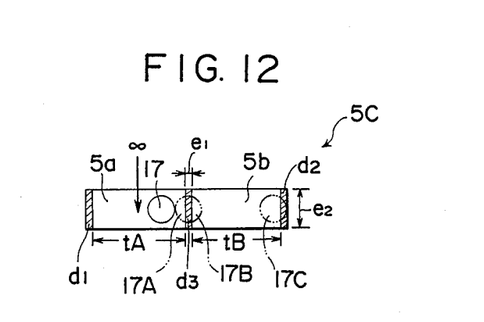
FIG. 12 is a front view illustrating a detecting element of the range detector of third embodiment.

In FIG. 11, which illustrates a third embodiment of a range detector according to the present invention, the same detecting element PSD 5C as that in the first embodiment is used which has signal electrodes $d_1$ and $d_2$ at opposite ends of the PSD 5c and an intermediate electrode $d_3$ in the middle thereof. Thus, a light receiving plane of the PSD 5c is divided into two areas 5a and 5b by the electrode $d_2$. FIG. 12 is a front view of the PSD 5c when viewing from an object being photographed.

A width $e_1$ of the electrode $d_3$ can be made small to the extent of $e_1 \approx 0$ with reference to an incident spot image 17 by providing an electrode for wire bonding externally of the PSD 5c. Consequently, the PSD 5c is divided into PSDs 5a and 5b having light receiving areas of widths tA and tB, respectively.

As shown in FIG. 11, the optical axis of a light receiving lens 4 is in agreement with the center of the PSD 5a and the electrodes $d_1$, $d_3$ and $d_2$ are fixed at the same electric potential by a signal processing circuit 6 such that signal currents $I_1$, $I_3$ and $I_2$ can be respectively produced from the electrodes $d_1$, $d_3$ and $d_2$.

When light rays are projected onto an object being photographed 3 or 3′ and light rays reflected thereby are received by the PSD 5c, let us discuss the following simplified four cases, ① the whole spot image 17 lies on the PSD 5a,
② the image 17 lies over the PSD 5a and 5b,
③ the whole image 17 lies on the PSD 5b, and
④ the image 17 extends over the PSD 5b and the signal electrode $d_2$.

In the case ①, a signal photocurrent produced in the PSD 5a is divided into the electrodes $d_1$ and $d_3$ and since the electrodes $d_2$ and $d_3$ have the same potential no current flows through the electrode $d_2$. In the case ③, like the case ①, a signal photocurrent produced in the PSD 5b is divided into the electrodes $d_3$ and $d_2$ and since the electrodes $d_1$ and $d_3$ have the same potential no current flows through the electrode $d_1$.

In the case ②, the spot image 17 covers an area 17A in the PSD 5a and an area 17B in the PSD 5b. A photocurrent produced from the area 17A in the PSD 5a is divided into the electrodes $d_1$ and $d_3$ in accordance with the center of gravity of light density in the area 17A and a photocurrent produced from the area 17B in the PSD 5b is divided into the electrodes $d_3$ and $d_2$ in accordance with the center of gravity of light density in the area 7b. In the case ④, the spot image 17 covers an area 17C in the PSD 5b and a photocurrent from the PSD 5B is divided into the electrodes $d_3$ and $d_2$ in accordance with the center of gravity of light density in the area 17C.

Figure 13:
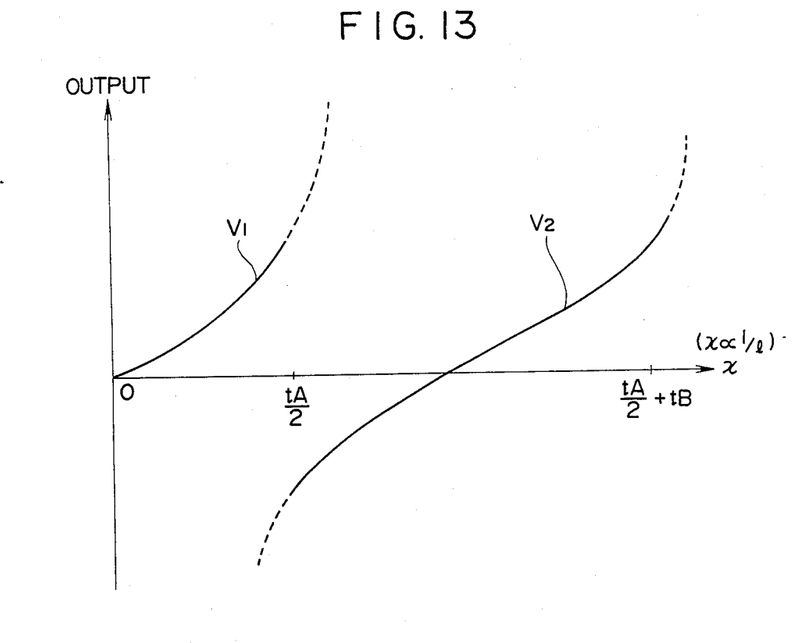
FIG. 13 is a diagram illustrating the relation between an output and a position of incident light in the range detector of the third embodiment.

FIG. 13 is a diagram illustrating the relationship of outputs $V_1$ generated by signal currents flowing through the electrodes $d_1$ and $d_3$ and outputs $V_2$ generated by signal currents flowing through the electrodes $d_2$ and $d_3$ to a distance x of the center of the image 17 from the optical axis. These outputs, in order to expand a dynamic range in measurement, are given by logarithmically converting signal currents and finding their differences.

An output $V_1$ from the electrodes $d_1$ and $d_3$ is $$V_1 = ln(I_3/I_1)$$

and an output $V_2$ from the electrodes $d_3$ and $d_2$ is $$V_2 = ln(I_3/I_2).$$

In FIG. 13, using an output curve $V_1$ in a range from $x=0$ to $x \approx (\frac{1}{2})tA$, that is, from a range $l=\text{infinity}$ to approximately $l = s \cdot f/(\frac{1}{2})tA$ of an object being photographed and an output curve $V_2$ in a range from $x \approx (\frac{1}{2})tA$ to $x \approx (\frac{1}{2})tA + tB$, that is, from approximately $l = s \cdot f/(\frac{1}{2})tA$ to a closer range of the object, it is possible to determine an object range l from the equation (i) shown above by obtaining a signal current ratio.

Figure 14:
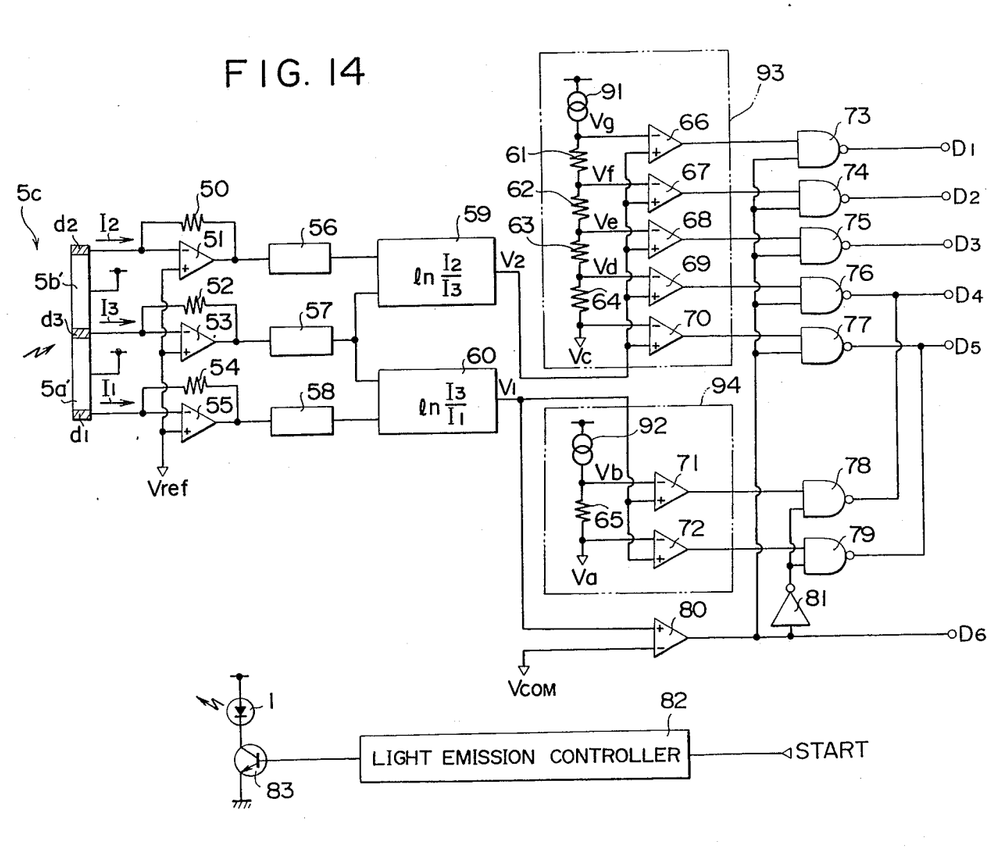
FIG. 14 is a diagram of an electric circuit used in the range detector of the third embodiment.

In FIG. 14, which illustrates an electric circuit in the range detector of the third embodiment according to the present invention, a PSD 5C including light receiving planes 5a and 5b is the one shown in FIGS. 11 and 12. The signal electrodes $d_1$, $d_2$ and $d_3$ respectively produce photocurrents $I_1$, $I_2$ and $I_3$ in accordance with light beams reflected by an object being photographed.

The light beams are emitted from an IRED 1 which operates by turning on a transistor 83 for light emission through a control circuit 82 for light emission. These photocurrents $I_1$, $I_2$ and $I_3$ are delivered to current-voltage conversion circuits comprising operational resistors 50, 53 and 55, respectively, to be converted to voltages. Since a reference voltage Vref is applied at non-inverting input terminals of the amplifiers 51, 53 and 55, the electrodes $d_1$, $d_2$ and $d_3$ are of the same potential as the reference voltage Vref. Outputs of the amplifiers 51, 53 and 55 are respectively applied to filter circuits 56, 57 and 58. The filter circuits 56, 57 and 58 serve to detect only changes in photocurrent after photocurrents stationarily produced by background light and the like are removed from photocurrents produced by light beams reflected by an object being photographed with projection of the IRED 1. Outputs of the filter circuits 56, 57 and 58 are applied to range signal generators 59 and 50. The generator 59 delivers a signal corresponding to an object range detected by the PSD 5b which signal is obtained by logarithmically compressing outputs of the filter circuits 56 and 57 and taking the difference between the compressed outputs. The generator 60 delivers a signal corresponding to an object range detected by the PSD 5a which signal is obtained by logarithmically compressing outputs of the filter circuits 57 and 58 and taking the difference between the compressed outputs. The output $V_2$ of the range signal generator 59 is applied to an A/D converter 93 comprising comparators 66 to 70, resistors 61 to 64 and a constant current source 91. Voltages Vg to Vc shown in FIG. 15 which are divided by the constant current source 51 and resistors 61 to 64 are applied to the inverting input terminals of the comparators 66 to 70 and an output of the range signal generator 59 is applied to the non-inverting input terminals of the comparators 66 to 70.

In addition, an A/D converter 94 to which an output $V_1$ of the range signal generator 60 is applied comprises comparators 71 and 72, a resistor 65 and a constant current source 92. The output $V_1$ is applied to the non-inverting input terminals of the comparators 71 and 72 and voltages Vb and Va shown in FIG. 15 which are divided by the constant current source 92 and the resistor 65 are applied to the inverting input terminals of the comparators 71 and 72.

Figure 15:
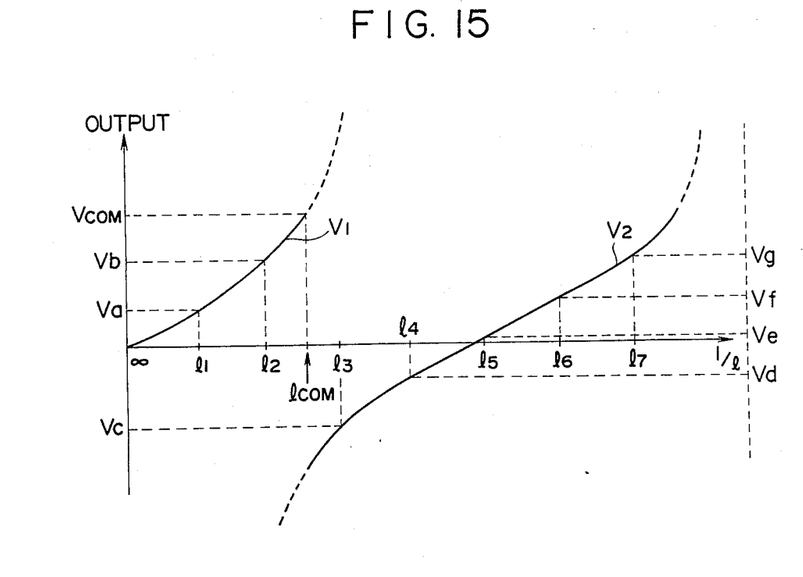
FIG. 15 is a diagram illustrating the relation between an output and a reciprocal of an object range in the range detector of the third embodiment.

Outputs of comparators 66 to 72 in the A/D converters 93 and 94 are connected to one of the input terminals of respective NAND gates 73 to 79. Output terminals of the NAND gates 73 to 79 are open collectors. In addition, the NAND gates 76 and 78 and the NAND gates 77 and 79 are connected in wired OR. The output $V_1$ of the range signal generator 60 is connected to the noninverting input terminal of a comparator 80. An output of the comparator 80 is connected to the other input terminals of the NAND gates 73 to 77 and an output inverted in phase by an inverter 81 is applied to the other input terminals of the NAND gates 78 and 79. A voltage $V_{COM}$ shown in FIG. 15 is applied to the inverting input terminal of the comparator 80.

In operation, when a start signal is delivered to the control circuit 82, the transistor 83 turns on to emit light beams from the IRED 1. Light beams projected onto and reflected by an object being photographed (not shown) impinge on PSD 5a′ or 5b′ to form a spot image. Then, as described above, the incident light beams on PSD 5a′ or 5b′ are given as signal currents $I_1$, $I_2$ and $I_3$ which are photoelectrically converted at the signal electrodes $d_1$, $d_2$ and $d_3$ in accordance with a position of the incident light beams. The signal currents $I_1$, $I_2$ and $I_3$ receive current-voltage conversions by current-voltage conversion circuits respectively comprising the resistor 50 and amplifier 51, the resistor 52 and amplifier 53 and the resistor 54 and amplifier 55, and removal of a photocurrent produced by stationary light by the respective filter circuits 56, 57 and 58. Thus, changes in the converted output voltages excluding the stationary photocurrent, that is, components corresponding to light beams reflected by the object are produced. These components further receive logarithmic compression and subtraction in the range signal generators 59 and 60 to produce outputs $V_2$ and $V_1$. The output $V_2$ from the range signal generator 59 is $$V_2 = f(\ln (I_2/I_3))$$

and the output $V_1$ from the range signal generator 60 is $$V_1 = f(\ln (I_3/I_1)),$$

where f represents a function for current-voltage conversion.

When an optical system is set as shown in FIG. 11 and a coordinate system is set such that the abscissa represents a reciprocal of an object range and the ordinate represents a ratio between signal currents from the PSD $5a'$ and $5b'$ which are given by the range signal generators 60 and 59, output curves $V_1$ and $V_2$ are obtained as shown in FIG. 15. When an object range l is divided into several zones such as ∞ to $l_1$, $l_1$ to $l_2$,--) as shown in FIG. 15, a scope of range measurement with PSD $5a$ is defined by a range decision scope of ∞ to $l_{COM}$ on the basis of the output $V_1$. Decision voltages corresponding to two points $l_1$ and $l_2$ within the range decision scope are Va and Vb. Voltages Va and Vb are developed by the constant current source 92 and the resistor 65 in the A/D converter shown in FIG. 14 to be respectively used as decision voltages for the comparators 72 and 71. Similarly, when five points of $l_3$, $l_4$, $l_5$, $l_6$ and $l_7$ are selected as the range decision points on the basis of the output $V_2$, these decision voltages are Vc, Vd, Ve, Vf and Vg as shown in FIG. 15 to be respectively used as decision voltages for comparators 70, 69, 68, 67 and 66 in FIG. 14. In addition, assuming that an object range close to $x=(\frac{1}{2})tA$ is $l_{COM}$, a decision voltage on the basis of the output $V_1$ which is made at the inverting input terminal of the comparator 80. when an object being photographed lies between $l_1$ to $l_2$, an output from the comparator 72 is at the "H" level, an output from the comparator 71 is at the "L" level and all outputs from the comparator 66 to 70 are at the "L" level. In addition, since an output from the comparator 80 is at the "L" level, all outputs from NAND gates 73 to 77 are at the "H" level irrespective of outputs of the comparators 66 to 70. On the other hand, since the output of the comparator 80 of the "L" level is inverted by the inverter 81 to the "H" level to be applied to a gate to which the NAND gates 78 and 79 are connected in common, outputs of the NAND gates 78 and 79 respectively turn to the "H" and the "L" levels. Outputs of the NAND gates 76 and 78 as well as the NAND gates 77 and 79 are wired or by the open collectors, as described above, and are pulled up to the power source voltage by a pull up resistor, not shown. Thereby, a voltage $V_1$ can be obtained from output terminals $D_1$ to $D_5$, thus obtaining an output from the PSD $5a'$ of the light receiving element. As such an output terminal $D_6$ is at the "L" level when outputs decided by a voltage $V_1$ in FIG. 15 are delivered to the terminals $D_1$ to $D_5$ and at the "H" level when the output is decided by a voltage $V_2$.

The following table shows combinations of logic levels at output terminals $D_1$ to $D_6$ in each of zones which an object range is divided into ∞ to $l_1$, $l_1$ to $l_2$, ---. Lines 1 to 3 show the case where images are formed on the PSD $5a'$ by light rays reflected by an object being photographed and hence decisions by a voltage $V_1$ in FIG. 15. Lines 4 ff show the case where images are formed on the PSD $5B'$ and hence decisions by a voltage $V_2$. These divisions are made by the levels "H" and "L" at the terminal $D_6$.

TABLE

| l | | | | $D_1$ | $D_2$ | $D_3$ | $D_4$ | $D_5$ | $D_6$ |
|---|---|---|---|---|---|---|---|---|---|
| ∞ | ≧ | l > | $l_1$ | H | H | H | H | H | L |
| $l_1$ | ≧ | l > | $l_2$ | H | H | H | H | L | L |
| $l_2$ | ≧ | l > | $l_{COM}$ | H | H | H | L | L | L |
| $l_{COM}$ | ≧ | l > | $l_3$ | H | H | H | H | H | H |
| $l_3$ | ≧ | l > | $l_4$ | H | H | H | H | L | H |
| $l_4$ | ≧ | l > | $l_5$ | H | H | H | L | L | H |
| $l_5$ | ≧ | l > | $l_6$ | H | H | L | L | L | H |
| $l_6$ | ≧ | l > | $l_7$ | H | L | L | L | L | H |
| $l_7$ | ≧ | l | | L | L | L | L | L | H |

In the present invention outputs as shown in Table from the output terminals $D_1$ to $D_6$ are delivered to a CPU not shown. A decision means for selecting a divided light receiving plane of a PSD which predominates in light receiving from combinations of these outputs and an object range is detected by an output of the selected divided light receiving plane.

While, in the foregoing embodiments, only one electrode $d_3$ is provided in the middle of the PSD $5c$, it is of course possible to improve in the accuracy of range measurements and the extension of a range measuring scope on a closer range side by providing two or more electrodes. At this time, it will be understood that it is necessary to add one or more terminals to the terminal $D_6$.

As described above, a range measuring scope using a single PSD has been limited in the past and even when a range measuring scope is expanded by extending the length of a single PSD, a change in its output with a change in an object range is so small that a range measuring accuracy is deteriorated at extraneous light. Consequently, it is impossible to extend a light receiving plane so much and thus the range measuring scope is limited. In the present invention, however, since a signal electrode or electrodes are added in the middle of a light receiving plane of a single PSD to separate the light receiving plane of the PSD into a plurality of sections, it is possible to measure a range covering a wider scope and to increase an accuracy more in range measurement than conventional range detectors.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A range detector comprising:
   light projecting means for projecting light rays onto an object to be measured;

light receiving means disposed at a given base length apart from said light projecting means for receiving light rays reflected by said object, said light receiving means including a single semiconductor position detcting element (PSD) provided with a plurality N of signal electrodes (where $N \geq 3$) arranged at spaced intervals in a direction of the base length; and range detecting means for detecting a range to the object by calculating the ratio of the outputs from the signal electrodes.

2. A range detector according to claim 1 in which said signal electrodes are selected in accordance with a range to be measured such that output currents from a pair of signal electrodes of N Pieces are used to detect a range.

3. A range detector according to claim 2, in which said selection of a pair of signal electrodes is made by comparing a range signal output in said range detecting means with a reference voltage predetermined by considering a detecting accuracy, a detectable close range and the like.

4. A range detector according to claim 1 in which said range detecting means receives light rays on light receiving planes divided into (N−1) areas with said selected pair of signal electrodes of N pieces of said position detecting element (PSD) and receives output signals from said selected pair of signal electrodes lying at opposite ends of each of said light receiving planes to calculate said output signals to detect a range to the object to be measured.

5. A range detector according to claim 4 in which said range detecting means is provided with decision means for selecting one of said divided light receiving planes of said PSD which predominates in light receiving so as to detect a range by an output produced with said selected divided light receiving plane.

6. A range detector according to claim 5 in which said decision means makes a decision by setting a decision voltage corresponding to a range decision scope.

7. A range detector according to claim 1 in which said signal electrode of said position detecting element PSD comprises an electrode for bonding wires externally provided thereon.

8. A range detector comprising:
light projecting means for projecting light rays onto an object to be measured;
a semiconductor position detecting element (PSD) disposed at a given base length apart from said light projecting means including a pair of signal electrodes from which a current flows with a current ratio depending upon a reflected position of said light rays wherein said semiconductor position detecting element further includes at least one intermediate electrode between said pair of signal electrodes;
selecting means for changing over between the case where an output current from said pair of signal electrodes is employed for the range detection and the case where an output current between one of said pair of signal electrodes and said intermediate electrode; and
range calculating means for calculating the ratio between the output currents selected by said selecting means to detect a range to the object.

9. A range detector according to claim 8 further comprising a condensing lens for focussing light on said PSD, the optical axis of said condensing lens being substantially aligned with the center of said PSD and in which said at least one intermediate electrode is provided on one side of the center of the optical axis of said condensing lens.

10. A range detector according to claim 8 further comprising a plurality of intermediate electrodes and in which the midpoint between said pair of signal electrodes is in agreement with the midpoint of said plurality of said intermediate electrodes.

11. A range detector comprising:
light projecting means for projecting light rays onto an object to be measured;
a semiconductor position detecting element (PSD) disposed at a given base length apart from said light projecting means wherein said semiconductor position detecting element is separately provided with signal electrodes of N where ($N \geq 3$) pieces arranged in spaced apart fashion along one surface of said PSD and in the direction of the base length by which the light receiving plane of said position detecting means is divided into (N−1) light receiving surface areas; and
calculating means for calculating a range to the object to be measured by output signals from said signal electrodes placed at opposite ends of one of the light receiving areas defined by said signal electrodes.

12. A range detector according to claim 11 wherein said calculating means further comprises means for establishing a plurality of different threshhold levels;
means for comparing the output signal of those adjacent comparison means which are different are utilized to determine the range of the object.

13. A range detector according to claim 12 wherein said calculating means further comprises means for forming signal ratios of said output signals for coupling to said comparison means.

14. A range detector according to claim 13 wherein said signal ratios are converted to signals whose values represent natural logarithms of said ratios.

15. A range detector according to claim 14 wherein said calculating means further comprises means for converting the outputs of said comparison means in digital form to aid in the determination of the range of said object.

16. A process of detecting the range of an object from a measurement by projecting light rays onto an object to be measured and receiving the reflected light rays upon the sensing portion of a semiconductor position detecting element having three or more electrodes forming part of the sensing portion to obtain its output current ratio, comprising the steps of:
(a) initially projecting light rays onto the object whose range is to be measured;
(b) calculating a ratio between output currents of two selected electrodes of said three or more electrodes wherein the signal of said output currents is a function of the position of the light reflected from said object along the semiconductor position detecting element;
(c) detecting whether said output current ratio is within a given range;
(d) secondarily projecting light rays onto the object when said output current ratio is beyond the given range; and
(e) calculating a ratio between output currents of a different combination of output currents from those employed during step (b) to determine a range to the object.

17. A range detector including light projecting means for projecting light rays onto an object to be measured and a semiconductor position detecting element disposed at a given base length apart from said light projecting means for receiving light rays reflected by the object for detecting a range to the object based on an output current ratio from said position detecting element, characterized in that said semiconductor position detecting element has at least a pair of electrodes and at least one intermediate electrode wherein said electrodes are arranged along one surface of said semiconductor position detecting element for providing signals utilized to determine the range of the object from said range detector.

18. A method for detecting the range of an object from a measuring location at which a semiconductor position detector element having three or more signal electrodes arranged along one surface thereof is located, said method comprising the steps of:
   directing light rays from said measurement location toward said object, said semiconductor position detecting element being aligned to receive light reflected from said object whereby a current is developed at each of said electrodes, said currents having a signal strength which is a function of the distance between the object and the range measurement location;
   forming ratios of the developed output currents;
   comparing said ratios against a plurality of threshold levels, each level having a different value; and
   determining the distance range of said object from said measurement location based on the value of the ratio values relative to said threshhold values.

19. The method of claim 18 wherein the current ratios are ratios of natural logarithmic values of said currents.

20. The method of claim 18 wherein the current ratios formed utilize currents derived from electrodes of the position detecting element which represents different region of said position detecting elements extending between the electrodes.

21. A range detector comprising:
   light projecting means for projecting light rays onto an object to be measured;
   lens means disposed at a given distance apart from said light projecting means for focusing light rays reflected by said object;
   light receiving means for range detection which receives light rays focused by said lens means;
   said light receiving means having a pair of signal electrodes disposed at opposite ends thereof and an intermediate electrode disposed between said pair of signal electrodes along one surface of said light receiving means such that the optical axis of said focusing lens means passes between said intermediate electrode and one of said pair of signal electrodes; and
   calculating means for detecting a range to the object by calculating a ratio of the output currents fed from the electrodes of said light receiving means.

22. A range detector comprising:
   light projecting means for projecting light rays onto an object to be measured;
   lens means disposed at a given distance apart from said light projecting means for focusing light rays reflected by said object;
   light receiving means for range detection which receives light rays focused by said lens means;
   said light receiving means having a pair of signal electrodes disposed at opposite ends thereof and an intermediate electrode disposed between said pair of signal electrodes such that the optical axis of said focusing lens means passes between said intermediate electrode and one of said pair of signal electrodes;
   calculating means for detecting a range to the object by calculating a ratio of the output currents fed from the electrodes of said light receiving means;
   means having a first state for coupling one of said pair of signal electrodes and said intermediate electrode to said calculating means and a second state for coupling the other one of said pair of signal electrodes and said intermediate electrode to said calculating means, said coupling means normally being in said first state; and
   means for judging if said coupling means should be changed to said second state based on the outputs from the electrodes coupled to the calculating means when in said first state.

23. A light receiving device for a range detector for detecting a range to an object to be measured based on the principle of triangular range detection by measuring the position of light rays reflected by the object with light rays projected onto the object, comprising:
   semiconductor position detecting means having a light receiving surface and a pair of signal electrodes disposed at opposite ends thereof and a common electrode disposed on the reverse side of said light receiving surface thereof for delivering output currents from respective electrodes whose magnitudes vary in accordance with the position at which said reflected light rays impinge upon said light receiving surface;
   at least one intermediate electrode provided on the light receiving surface and disposed between said pair of signal electrodes; and
   range determining means selectively coupled to at least two of the electrodes on said light receiving surfaced for determining the range to said object based upon the signal strengths of the signals coupled to said range determining means.

* * * * *

UNITED STATES PATENT AND TRADEMARK OFFICE
CERTIFICATE OF CORRECTION

PATENT NO. : 4,849,781

DATED : July 18, 1989

INVENTOR(S) : H. Nakazawa et al.

It is certified that error appears in the above-identified patent and that said Letters Patent is hereby corrected as shown below:

Column 8, line 5, "resistors" should be --amplifiers--

Column 8, line 6, "50" should be --51--

Column 8, line 6, after "55" insert --and negative feedback resistors 50, 52 and 54--

Column 8, line 18, "50" should be --60--

Column 9, line 33, "5a" should be -- 5a' --

Column 9, line 47, after "V$_1$" insert --is V$_{COM}$--

Column 11, line 5, "detcting" should be --detecting--

Column 12, line 48, after "measurement" insert --location--

Signed and Sealed this

Thirtieth Day of April, 1991

*Attest:*

HARRY F. MANBECK, JR.

*Attesting Officer*          *Commissioner of Patents and Trademarks*